(12) United States Patent
Wantling et al.

(10) Patent No.: US 7,696,253 B2
(45) Date of Patent: *Apr. 13, 2010

(54) WATER-RESISTANT ADDITIVES FOR GYPSUM WOOD FIBER PRODUCTS

(75) Inventors: Steven J. Wantling, Brandon, MS (US); Bonnie Zepka, Louisville, KY (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 1188 days.

This patent is subject to a terminal disclaimer.

(21) Appl. No.: 10/528,471

(22) PCT Filed: Jun. 5, 2003

(86) PCT No.: PCT/US03/17786

§ 371 (c)(1), (2), (4) Date: Mar. 21, 2005

(87) PCT Pub. No.: WO2004/061042

PCT Pub. Date: Jul. 22, 2004

(65) Prior Publication Data

US 2006/0051619 A1 Mar. 9, 2006

Related U.S. Application Data

(60) Provisional application No. 60/435,329, filed on Dec. 20, 2002, provisional application No. 60/454,131, filed on Mar. 12, 2003.

(51) Int. Cl.
- *C08L 71/10* (2006.01)
- *C08L 91/06* (2006.01)
- *C08L 3/00* (2006.01)

(52) U.S. Cl. .......................... 516/38; 516/77; 106/271; 525/390

(58) Field of Classification Search .................. 516/38, 516/77; 106/271; 525/390
See application file for complete search history.

(56) References Cited

U.S. PATENT DOCUMENTS

| | | | |
|---|---|---|---|
| 2,699,414 A | 1/1955 | Selbe et al. ............... 154/45.9 |
| 3,869,414 A | 3/1975 | Campbell ...................... 260/6 |
| 3,891,453 A | 6/1975 | Williams ..................... 106/85 |
| 3,935,021 A | 1/1976 | Greve et al. ................. 106/111 |
| 4,019,920 A | 4/1977 | Burkard et al. ............. 106/114 |
| 4,042,409 A | 8/1977 | Terada et al. ................ 106/111 |
| 4,094,694 A | 6/1978 | Long ........................... 106/111 |
| 4,174,230 A | 11/1979 | Hashimoto et al. .......... 106/109 |
| 4,239,716 A | 12/1980 | Ishida et al. .................. 264/86 |
| 4,328,178 A | 5/1982 | Kossatz ........................ 264/69 |
| 4,392,896 A | 7/1983 | Sakakibara ................... 156/39 |
| 4,421,704 A | 12/1983 | Reily .......................... 264/133 |
| 4,645,548 A | 2/1987 | Take et al. ..................... 156/39 |
| 4,734,163 A | 3/1988 | Eberhardt et al. ......... 162/181.3 |
| 4,748,196 A | 5/1988 | Kuroda et al. ................. 524/43 |
| 5,009,269 A | 4/1991 | Moran et al. ................ 166/293 |
| 5,120,355 A | 6/1992 | Imai .............................. 106/2 |
| 5,320,677 A | 6/1994 | Baig .......................... 106/780 |
| 5,322,872 A * | 6/1994 | Quinn ........................ 524/186 |
| 5,366,648 A * | 11/1994 | Salomon et al. ............. 508/251 |
| 5,482,551 A | 1/1996 | Morris et al. ............... 106/772 |
| 5,695,553 A | 12/1997 | Claret et al. ................ 106/778 |
| 5,922,447 A | 7/1999 | Baig ....................... 428/292.7 |
| 5,968,237 A | 10/1999 | Sinnige .......................... 106/2 |
| 5,980,628 A | 11/1999 | Hjelmeland et al. ......... 106/778 |
| 6,010,596 A | 1/2000 | Song .......................... 162/158 |
| 6,066,201 A | 5/2000 | Wantling .................... 106/271 |
| 6,162,839 A | 12/2000 | Klauck et al. ................. 521/83 |
| 6,165,261 A | 12/2000 | Wantling .................... 106/778 |
| 6,172,122 B1 | 1/2001 | Lawate et al. ............... 516/109 |
| 6,231,656 B1 | 5/2001 | Dekerf et al. ............. 106/38.25 |
| 6,251,979 B1 | 6/2001 | Luongo ...................... 524/423 |
| 6,287,495 B1 | 9/2001 | Rosthauser ................. 264/109 |
| 6,585,820 B2 * | 7/2003 | Wantling et al. ............ 106/271 |
| 7,026,378 B2 * | 4/2006 | Manka et al. .................. 524/14 |
| 7,294,189 B2 * | 11/2007 | Wantling ................. 106/164.3 |
| 7,473,712 B2 * | 1/2009 | Wantling et al. .............. 516/38 |
| 7,473,713 B2 * | 1/2009 | Wantling et al. .............. 516/38 |
| 2005/0139174 A1* | 6/2005 | Cleveland et al. ........... 123/1 A |

FOREIGN PATENT DOCUMENTS

WO    WO 03/004433    1/2003

OTHER PUBLICATIONS

Rudnick, "Lubricant Additives, Chemistry and Applications", CRC Press, 2003, [ retrieved on May 20, 2008] .Retrieved from the Internet: <URL: http://books.google.com/books?id=QbF67SVKMbUC&pg=PA121&lpg=PA121&dq=%22methylene+coupled+alkylphenol%22&source=web&ots=e3yzlPnBMt&sig=-A_bOwhJNeH6qkcI8EE_3OWMpql&hl=en#PPA121,M1>, pp. 118-121.*

* cited by examiner

*Primary Examiner*—Steven P Griffin
*Assistant Examiner*—Dennis Cordray

(57) ABSTRACT

Emulsions are provided which are useful in imparting water-resistance to gypsum wood fiber products. In one embodiment, the emulsions comprise a wax or a combination of waxes, an alkyl phenol, at least one surfactant, Polynaphthalenesulfonic acid, and an alkali metal hydroxide. In another embodiment, the emulsions comprise a wax or a combination of waxes, an alkyl phenol, at least one surfactant, polynaphthalenesulfonic acid, an alkali metal hydroxide, and a complexed starch.

23 Claims, No Drawings

WATER-RESISTANT ADDITIVES FOR GYPSUM WOOD FIBER PRODUCTS

This application claims the benefit of U.S. Provisional Application No. 60/435,329, filed 20 Dec. 2002, and U.S. Provisional Application No. 60/454,131, filed 12 Mar. 2003.

FIELD OF THE INVENTION

The present invention relates to an additive useful in improving the water-resistance of gypsum wood fiber products. The present invention also relates to an emulsion which includes a wax or a combination of waxes, an alkyl phenol, at least one surfactant, polynaphthalenesulfonic acid, and an alkali metal hydroxide, the emulsion useful in improving the water resistance of gypsum wood fiber products. The present invention further relates to a method of making the emulsion.

BACKGROUND OF THE INVENTION

Certain properties of gypsum (calcium sulfate dihydrate) make it very popular for use in making industrial and building products; especially gypsum board. It is a plentiful and generally inexpensive raw material which, through a process of dehydration and rehydration, can be cast, molded or otherwise formed to useful shapes. The base material from which gypsum board is manufactured is the hemihydrate form of calcium sulfate (gypsum), commonly termed stucco, which is produced by the heat conversion of the dihydrate from which the water phase has been removed.

In the making of gypsum board, the gypsum slurry must flow onto a paper substrate. In a continuous process, the slurry/substrate combination is then sized by passing this combination between rollers. Simultaneous with this sizing step, a paper backing is positioned over the sized gypsum slurry. Accordingly, the gypsum slurry must possess sufficient fluidity so that a properly sized gypsum board can be made.

It is also important to the manufacture of gypsum board, that the gypsum slurry be capable of being foamed to a limited extent. Foamability refers to this ability to be foamed. When the gypsum slurry and paper substrate are passed through the sizing rollers, a certain amount of the gypsum slurry must back flow and accumulate in the rollers nip so that a steady flow of gypsum is delivered to the sizing rollers.

Because of the continuous nature of a gypsum board manufacturing process wherein the gypsum slurry flows onto a substrate which then passes through sizing rollers, the extent to which the gypsum slurry flows after it is sized is critical to maintaining the finished product dimensions of the gypsum board. The time at which the gypsum slurry ceases its flow is referred to as the pre-set time. The set time of the gypsum slurry is also an important property. The set time refers to the amount of time it takes the gypsum slurry to be dried, under heat, to the finished, solid gypsum board.

Gypsum board absorbs water, which reduces the strength of the wallboard. Prior art products, like ordinary gypsum board, gypsum tile, gypsum block, gypsum casts, and the like have relatively little resistance to water. When ordinary gypsum board, for example, is immersed in water, the board quickly absorbs a considerable amount of water, and loses a great deal of its strength. Actual tests have demonstrated that when a 2 inch by 4 inch cylinder of gypsum board core material was immersed in water at about 70° F., the cylinder showed a water absorption of 36% after immersion for 40 minutes.

The gypsum wood fiber (GWF) product differs from conventional gypsum wallboard products in that the GWF incorporates into the established slurry both gypsum and wood fibers. For example, in addition to lumber, particleboard, fiberboard, waferboard, plywood, recycled pulp and paper, and "hard" board (high density fiberboard) are some of the forms of processed lignocellulosic material products used in the building industry. Such materials have better tensile and flexural strength than gypsum. However, they are also generally higher in cost, have poor fire resistance and are frequently susceptible to swelling or warping when exposed to moisture. Therefore, affordable means to improve upon these use limiting properties of building products made from cellulosic material are desired.

Previous attempts to combine the favorable properties of gypsum and cellulosic fibers, particularly wood fibers, have had very limited success. Attempts to add cellulosic fibers, (or other fibers for that matter), to gypsum plaster and/or plasterboard core have generally produced little or no strength enhancement because of the heretofore inability to achieve any significant bond between the fibers and the gypsum. U.S. Pat. Nos. 4,328,178; 4,239,716; 4,392,896 and 4,645,548 disclose recent examples where wood fibers or other natural fibers were mixed into a stucco (calcium sulfate hemihydrate) slurry to serve as reinforcers for a rehydrated gypsum board or the like.

U.S. Pat. No. 4,734,163, teaches a process in which raw or uncalcined gypsum is finely ground and wet mixed with 5-10% paper pulp. The mash is partially dewatered, formed into a cake and further dewatered by pressure rolls until the water/solids ratio is less than 0.4. The cake is cut into green boards, which, after being trimmed and cut, are stacked between double steel plates and put into an autoclave. The temperature in the autoclave is raised to about 140° C. to convert the gypsum to calcium sulfate alpha hemihydrate. During the subsequent incremental cooling of the vessel boards, the hemihydrate rehydrates back to dihydrate (gypsum) and gives the boards integrity. The boards are then dried and finished as necessary.

U.S. Pat. No. 5,320,677 to Baig describes a composite material made from gypsum and host particles of a reinforcing material, such as lignocellulose fibers. The composite material is produced by mixing gypsum and host particles of a stronger substance, such as wood fibers, in a dilute aqueous slurry. The slurry is heated in an autoclave, preferably under pressure, to convert the gypsum to calcium sulfate alpha hemihydrate. The hot, converted slurry is discharged through a headbox onto a continuous felting conveyor of the type used in paper making operations, where the slurry is dewatered to remove as much uncombined water as possible before rehydrating the hemihydrate back to gypsum. The resulting material is a homogeneous mass comprising gypsum crystals physically interlocked with the discrete host particles. The resulting mat is then dried in heated convection or forced air drying ovens, and the dried board is cut to the desired dimensions. Baig teaches the addition of crystal modifiers to the slurry, but does not teach the addition of any additive to improve the water resistance of the final product.

These prior art products, like ordinary gypsum wallboard, gypsum tile, gypsum block, gypsum casts, and the like have relatively little resistance to water.

U.S. Pat. No. 6,010,596 to Song teaches adding a wax emulsion containing a combination of a paraffinic hydrocarbon, montan wax, polyvinyl alcohol, water and emulsifiers to a hot slurry containing ground gypsum and wood fiber. Emulsifiers include nonionic and cationic surfactants. While still hot, the slurry is discharged through a headbox onto a continuous felting conveyor, such as the type used in paper making operations, to form a felter cake and remove as much uncombined water as possible. Song does not teach an emulsion containing the novel combination of waxes, an alkyl phenol, at least one surfactant, polynaphthalenesulfonic acid, and an alkali metal hydroxide.

SUMMARY OF THE INVENTION

Embodiments of the present invention provide an additive emulsion and a method for making the emulsion that addresses the issues of water absorption, viscosity control, stability, and slurry fluidity in the manufacture of gypsum wood fiber composites.

In one embodiment, the present invention provides an emulsion including at least one wax, an alkyl phenol, at least one surfactant, a polynaphthalenesulfonic acid, an alkali metal hydroxide, and water. The polynaphthalenesulfonic acid and the alkali metal hydroxide react to give a salt of polynaphthalenesulfonic acid. Emulsions of this embodiment may be added to hot, even boiling, water without the emulsion separating or curdling. At room temperature, the emulsions of the present invention are pourable liquids and are stable for extended periods of time. The emulsions of the present invention, when added during the manufacture of gypsum wood fiber composites, improve the water-resistance of the composite.

In another embodiment, the present invention provides an emulsion including at least one wax, an alkyl phenol, at least one surfactant, a polynaphthalenesulfonic acid, an alkali metal hydroxide, water, and a starch.

In another embodiment, the present invention provides an emulsion including at least one wax, an alkyl phenol, at least one surfactant, a polynaphthalenesulfonic acid, an alkali metal hydroxide, water, and a complexed starch.

In another embodiment, the present invention provides a method for making an emulsion, including the steps of:

(a) heating to a temperature ranging from about 185° F. to about 210° F. a mixture containing at least one wax, an alkyl phenol, and at least one surfactant to provide a wax phase mixture;

(b) heating to a temperature ranging from about 185° F. to about 210° F. a mixture containing polynaphthalenesulfonic acid, an alkali metal hydroxide, and water, to provide a water phase mixture;

(c) adding the water phase mixture to the wax phase mixture to provide a mixture;

(d) homogenizing the mixture of step (c); and (e) cooling the homogenized mixture at a rate effective to control the stability and viscosity of the homogenized mixture.

Another embodiment of the invention is directed to a gypsum wood fiber composite manufactured using the emulsion of the present invention and a conventional paper making process.

A further embodiment of the present invention is an emulsion containing a first wax having a melting point of at least 120° F. in an amount of about 30 wt. % to about 45 wt. % by weight, based on the total weight of the emulsion; a saponifiable wax in an amount from about 3 to about 5 wt. %, based on the total weight of the emulsion; a combination of surfactants in an amount from about of about 0.5 to about 5 wt. %, based on the total weight of the emulsion; an alkyl phenol in an amount from about of about 0.5 to about 10 wt. %, based on the total weight of the emulsion; a polynaphthalenesulfonic acid in an amount from about 0.25% to about 5 wt. %, based on the total weight of the emulsion; water in an amount from about 45 to about 65 wt. %, based on the total weight of the emulsion; and an alkali metal hydroxide in an amount from about 0.5% to about 3 wt. %, based on the total weight of the emulsion.

DETAILED DESCRIPTION OF THE INVENTION

The Gypsum Wood Fiber (abbreviated as "GWF") product differs from conventional gypsum wallboard products in that the GWF incorporates into the established slurry both gypsum and wood fibers in a unique combination and ratio of from about 5 to 50 parts of wood fiber to a corresponding quantity of gypsum to achieve a 100% combination in a mixed form. Unlike the production of gypsum wallboard which incorporates a slurry through a formation mechanism and which requires that any additives tributary to the slurry chemistry not affect the fluidity of the slurry during the manufacturing process but control the inherent formation of process foam, the production of GWF is facilitated through a conventional paper making process utilizing a wet end section headbox distribution mechanism distributing the GWF slurry onto a vacuum wire for initial mat formation and dehydration followed by compression through a series of vacuum belt rolls and into a kiln for final dehydration. The addition of the emulsion must not cause wax plating or breakout on the vacuum belt. The GWF of the present invention does not incorporate paper face and back paper but rather is a paperless core that has similar performance and uses comparable to conventional sheathing products currently available.

The unique combination and ratios thereof of a $C_{24}$-$C_{36}$ and greater polymerized alkyl phenol, various waxes, co-surfactants selected from sorbitan esters such as fatty acid esters hexaoleate, polyoxyethylene sorbitan fatty acid esters, and a salt of polynaphalenesulfonic acid results in a stable wax emulsion suitable for incorporation into a GWF composite.

A preferred formulation is as follows in Table 1:

TABLE 1

| Raw Material Ingredient | Weight % |
| --- | --- |
| 145° F. Melt Point Wax | 37.9 |
| Saponifiable Wax | 5.0 |
| $C_{24}$-$C_{34}$ Alkyl Phenol | 5.0 |
| SPAN 60 | 0.3 |
| TWEEN 60 | 1.7 |
| 45.5% KOH | 0.1 |
| Polynaphthalene sulfonic acid | 1.0 |
| Water | 49.0 |

The process of water felting dilute aqueous dispersions of various fibrous materials is a well-known commercial process for manufacturing many types of paper and board products. In this process, an aqueous dispersion of fiber, binder and other ingredients, as desired or necessary, is flowed onto a moving foraminous support wire, such as that of a Fourdrinier or Oliver mat forming machine, for dewatering. The dispersion may be first dewatered by gravity and then dewatered by vacuum suction means; the wet mat is then pressed to a specified thickness between rolls and the support wire to remove additional water. The pressed mat is then dried in heated convection or forced air drying ovens, and the dried material is cut to the desired dimensions.

An embodiment of the invention is further directed to a method for making a gypsum wood fiber article, which includes the steps of:

(a) mixing a slurry containing from about 5 wt. % to about 50 wt. % of a wood fiber, from about 5 wt. % to about 50 wt.

% of gypsum, from about 1 wt. % to about 3 wt. % of the emulsion of the present invention, based on the total weight of the slurry and water;

(b) distributing the slurry onto a vacuum wire for formation of a mat;

(c) partially drying the mat of step (b);

(d) compressing the mat of step (c) through a series of vacuum belt rolls; and (e) drying the compressed mat of step (d) in an oven.

The amount of water in the slurry is an amount sufficient to distribute the slurry onto a vacuum wire for the formation of a mat. Various gypsum wood fiber articles may be made by this method including, but not limited to, wallboard and sheathing.

It has also been discovered that by utilizing starch compounds such as acid-modified, hydroxyethylated, oxidized, and/or cationic, in combination with a complexing agent and a salt of polynaphthalenesulfonic acid coupled with a polymerized alkyl phenol all in a correct relationship, that the noted deficiencies are corrected and a resulting wax emulsion having superior performance as a water absorption control additive is achieved. Furthermore, the compositions of the present invention function as anti-build-up additives with respect to wax build-up on the vacuum belt.

It has further been discovered that borate compounds, molybdate compounds, and molybdenum compounds are surprisingly effective complexing agents. Hereinafter, generically, molybdate and molybdenum compounds of the present invention will be referred to as molybdenum compounds. Examples of useful complexing agents include, but are not limited to, sodium borate, magnesium borate, and other borate compounds; ammonium molybdate, sodium molybdate, magnesium molybdate, and other molybdate compounds; molybdenum disulfide and other molybdenum compounds.

The ratio of complexing agent (for example, sodium tetraborate decahydrate, sodium molybdate dihydrate, molybdenum disulfide, or other compounds) to the modified starch significantly influences the control of other necessary properties in the board/slurry process, i.e. foam support and slurry additive compatibility.

It has further been discovered that these combinations and the ratios thereof are unique and necessary to formulate a stable and performing wax emulsion and that certain manufacturing processes must occur. The range of ratios of starch: borate, or starch:molybdenum compound may range from about 4:1 to about 20:1 on a weight/weight basis.

A further embodiment of the invention is directed to a gypsum wood fiber article containing wood fiber, gypsum and the wax emulsion of the present invention.

In the manufacture of gypsum wood fiber wallboard products it is important to impart water-resistance to the finished product, so as to limit the maximum water absorption realized by the wallboard in a defined board soak test. For example, American Standards for Testing Materials ASTM 1396 and sub parts thereof describe such a test.

Preparation of Emulsions:

In one embodiment of the present invention, water, a complexing agent (that is, a borate compound, or a molybdenum compound) and a starch are first brought together in order to make the complexed starch useful in embodiments of the present invention. Next, polynaphthalenesulfonic acid and potassium hydroxide are added to the aqueous solution of complexed starch. This mixture is brought to a temperature of about 185° F. to about 205° F. and held until the starch reaches its maximum state of gelation, which typically occurs in about 20 to about 30 minutes. The wax compounds are incorporated with the polymerized alkyl phenol and brought to a temperature of about 185° F. to about 205° F. Then, the wax phase is added to the water phase and reacted to form an in situ surfactant. A detergent/dispersant is formed by the combination and reaction of the polymerized alkyl phenol and the polynaphthalenesulfonic acid, which acts to modify the wax crystal and allows the wax crystals to resist plating and linking with themselves and instead remain in a disassociated state until they are transferred due to polarity to the gypsum. The reacted system is then passed through a homogenizer at a pressure of about 2,000 to about 4,000 psi and then cooled at a prescribed rate to control the stability and viscosity of the finished wax emulsion. The homogenized composition exits the homogenizer at a temperature of about 135° F. to about 145° F. The mixture is then cooled to about 80° F. to about 110° F. The cooling rate is controlled to avoid causing the wax to recrystallize and breakout of solution.

The term "wax emulsion", as used herein, means an aqueous emulsion of one or more waxes which is emulsified through the use of one or more surfactants. The wax emulsion must comprise a wax or waxes adapted to provide water resistance to the finished product. The wax or waxes must be inert with respect to the gypsum and wood fibers which make up the product.

Emulsions are prepared by heating the wax, an alkyl phenol, and at least one surfactant ("wax phase mixture") in one vessel and the water, polynaphthalenesulfonic acid, an alkali metal hydroxide ("water phase mixture") in another vessel. Both mixtures were heated, with mixing, to a temperature from about 185° F. to about 210° F. Next, the water mixture was poured into the wax mixture under mixing. The resultant mixture was then placed in a homogenizer. With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig., preferably from about 2500 to about 3000 psig.

The homogenized mixture is cooled after the homogenization step at a rate effective to control the stability and viscosity of the homogenized mixture. The viscosity of the homogenized mixture ranges from about 30 to about 200 cps., preferably from about 80 to about 100 cps. It is most preferable that the homogenized mixture be cooled from approximately 185° F. to about 100° F. This may be accomplished by running the homogenized mixture though a cooling coil immersed in water maintained at room temperature.

HLB Values:

The hydrophilic/lipophilic balance ("HLB") value describes the relationship of a compound to its solubility in water. An emulsifier having a low HLB value will tend to be oil soluble and one having a high HLB value will tend to be water soluble. Typically, a water soluble emulsifier or blends thereof are used to make an oil/water emulsion typical of those described herein, or to solubilize oils or waxes, or to obtain some measure of detergent action. Thus, the HLB value can be used to describe or select the proper emulsifier or emulsifier system.

Where two or more components are combined, the HLB value of the combination is the weighted average of the individual HLB values. The following formula may be used to calculate the HLB value of a combination of materials:

$$HLB(\text{combined}) = \frac{Q_1 \times (HLB_1) + Q_2 \times (HLB_2) + \ldots Q_n \times (HLB_n)}{Q_1 + Q_2 + \ldots Q_n};$$

where, $Q_1$=weight of material 1; $HLB_1$=HLB value of material 1
$Q_2$=weight of material 2; $HLB_2$=HLB value of material 2
$Q_n$=weight of material n; $HLB_n$=HLB value of material n Water Absorption Test:

The affect on water absorption of the compositions of the present invention was determined using the following procedure:

1) Make paper pulp: Blend 3.2 grams paper with 200 g $H_2O$ in blender set on low speed for 2 minutes.

2) Stir and heat pulp on hot plate until mixture reaches 190° F., then add 31.8 grams B-Base stucco and stir constantly until 190° F. us achieved.

3) On hot plate and stirring mixture, add 0.32 grams of a heat resistant additive ("HRA"), such as calcined gypsum, and 0.067 g papermakers alum. Remove from hot plate and add calculated amount of a water resistant emulsion of the present invention ("WR") using disposable pipette. The calculation is: 1/X grams WR where X is the solids content of the emulsion. For example; if the solids content is 40% add 1/0.4=2.5 grams emulsion to the hot mixture. This approximates a typical 3% WR usage level in line production. Place mixture on hot plate, stir and hold temperature for 1 minute.

4) Vacuum-filter the pulp/slurry mixture to produce even filter cake. Using the equipment described above this should take approximately 30 seconds. Remove the filtered cake to an aluminum pan and peel filter paper. Allow the cake to set for 20 minutes at ambient temperature, then placed in 180° F. oven for 30 minutes, then dry to constant weight at 100° F.

5) Weigh the dried cake. Immerse the cake in water for 30 minutes. Blot out excess water and weigh the cake again. Calculate water absorption.

Materials:

Various sources of gypsum may be used in the compositions of the present invention. The term "gypsum", as used herein, means calcium sulfate in the stable dihydrate state; i.e., $CaSO_4 2H_2O$, and includes the naturally occurring mineral, the synthetically derived equivalents, and the dihydrate material formed by the hydration of calcium sulfate hemihydrate (stucco) or anhydrite. The term "calcium sulfate material", as used herein, means calcium sulfate in any of its forms, namely calcium sulfate anhydrite, calcium sulfate hemihydrate, calcium sulfate dihydrate and mixtures thereof. Gypsum is available from most coal-burning power plants such as Duke Power or Kentucky Power.

The term "gypsum wood fiber" (GWF), as used herein, is meant to cover a mixture of gypsum and host particles, e.g, wood fibers. However, the amount of water required to hydrate a gypsum sample will vary with the purity of the sample. The amount of gypsum present in the mixture ranges from about 5 parts to about 50 parts, based on the total weight of the mixture. The wood fiber is commonly referred to in the art as wood furnish. Examples of wood fiber include, but are not limited to, softwood sources such as pines, spruces and firs, and hardwood sources such as oaks, maples, eucalyptuses, poplars, beeches, and aspens.

Waxes useful in making the various embodiments of the present invention may be selected from any of the commercially known waxes which have a melting point of from about 120° F. to about 150°, and preferably from about 135° F. to about 145°. Such waxes are typically of low volatility, exhibiting less than about a 10% loss in weight during standard thermogravimetric analysis. Also, the oil content of these waxes is typically less than about 1% by weight. These waxes are of a relatively high molecular weight, having an average chain length of $C_{36}$, that is a 36 carbon chain length, or greater. A preferred wax is Honeywell 3816. The wax is present in an amount ranging from about 30 to about 45 wt. %, based on the total weight of the emulsion.

A preferred combination of waxes is a combination of montan wax and Honeywell 3816. In this preferred embodiment, the amount of montan wax present ranges from about 3 to about 5 wt. % and the amount of Honeywell 3816 present ranges from about 30 to about 45 wt. %, based on the total weight of the emulsion.

In certain embodiments, it is useful to saponify one or more of the waxes. In this way, the saponified wax functions as an added surfactant. Waxes useful in this respect are limited to waxes having an acid value or a saponification value and a melting point greater than about 180° F. Saponification of such waxes may be accomplished by combining the wax with a strongly basic material such as sodium hydroxide or potassium hydroxide. Waxes which may be saponified in the emulsions of the present invention include montan wax, carnauba wax, beeswax, bayberry-myrtle wax, candelilla wax, caranday wax, castor bean wax, esparto grass wax, Japan wax, ouricury wax, retamo-ceri mimbi wax, shellac, spermaceti wax, sugar cane wax, wool-lanolin wax, and others. The amount of strongly basic material needed to saponify a wax may be calculated based on the saponification value of the wax. For example, the saponification value divided by 1000 equals the grams of potassium hydroxide to add per gram of wax.

The alkali metal hydroxide is selected from the group consisting of sodium hydroxide and potassium hydroxide. The amount of alkali metal hydroxide present in the emulsion ranges from about 0.5 to about 3.0 wt. %, based on the total weight of the emulsion.

Surfactants include, but are not limited to sorbitan esters. Examples of suitable sorbitan esters include, but are not limited to, sorbitan fatty acid esters, fatty acid esters hexaoleate, polyoxyethylene sorbitan fatty acid esters, and combinations thereof. An example of a sorbitan fatty acid ester useful in the present invention is SPAN 60, which is sorbitan monostearate. SPAN 60 is available from ICI Americas, Inc., Wilmington, Del. An example of a polyoxyethylene sorbitan fatty acid ester useful in the present invention is TWEEN 60, which is polyoxyethylene(20) sorbitan monostearate. TWEEN 60 is available from ICI Americas, Inc., Wilmington, Del. The amount of surfactant in the emulsion ranges from about 0.5 to about 5 wt %, based on the total weight of the emulsion.

More than one surfactant may be employed in the emulsion. A preferred combination of surfactants is a sorbitan monostearate and a polyoxyethylene sorbitan monostearate, wherein the combination of surfactants is present in an amount ranging from about 0.5 to about 5 wt. %.

In one embodiment, starch used in the emulsions of the present invention is complexed starch. The starch may be complexed in situ, during manufacture of the emulsion, or the starch may be pre-complexed prior to being added to the emulsion. Starch is preferably complexed by mixing the starch with a complexing agent such as a borate compound or a molybdenum compound. Compounds useful as complexing agents include ammonium biborate, ammonium pentaborate, sodium tetraborate (borax), potassium pentaborate, potassium tetraborate, lithium tetraborate, and magnesium borate compounds; ammonium dimolybdate, ammonium heptamolybdate, barium molybdate, calcium molybdate, lithium molybdate, magnesium molybdate, sodium molybdate, and potassium molybdate; molybdenum disulfide, and other molybdenum compounds, and the like. The starch useful in making the complexed starch of the present invention includes, but is not limited to, corn, rice, wheat, potato, sago and other starches. The ratio of complexing agent (a borate compound, or a molybdenum compound) to starch is important to the functionality of the complexed starch in the emulsions. It has been found that the ratio may be as low as 1:20, of complexing agent (a borate compound, or a molybdenum compound) to starch on a weight per weight basis. The ratio may be as high as 1:3.5, however it has been found that at this ratio, and higher ratios, a greater amount of complexed starch is needed in the emulsion to maintain the balance of desired properties in the gypsum mixture and final gypsum product. These desired properties include fluidity, foamability, and water-resistance.

Incorporating alkyl phenols into the emulsions has been found important to achieving low water absorption in the final gypsum wood fiber product. As used herein, "alkyl phenols" refer to phenolic compounds having a long chain alkyl group. The long chain alkyl group may be straight or branched. The long chain alkyl group may be $C_{24}$-$C_{34}$ (from 24 to 34 carbon chain length). Such alkyl phenols include long chain, $C_{24}$-$C_{34}$ (from 24 to 34 carbon chain length) polymerized methylene-coupled alkyl phenol, phenate salts, calcium phenates, long branched chain calcium alkyl phenols, long straight chain calcium alkyl phenols and complex polymers of maleic acid with and without an amine group substitution. One example of an alkyl phenol useful in the compositions of the present invention is described below.

| Identification No. | Description | Source |
|---|---|---|
| 319H | $C_{24}$-$C_{34}$ polymerized methylene-coupled alkyl phenol | Lubrizol Chem. Corp. Wycliffe, Ohio |

The amount of alkyl phenol present in the emulsion ranges from about 0.5 to about 10 wt %, based on the total weight of the emulsion.

Starch compounds such as acid-modified, hydroxyethylated, oxidized, and/or cationic may also be added to the emulsion. The amount of starch ranges from about 0.1 to about 2 wt. %, based on the total weight of the emulsion.

Bactericides/fungicides can be included in the present invention. An example of a bactericide fungicide is META-SOL D3TA, which is 3,5-dimethyl-tetrahydro-1,3,5,2H-thiadiazine-2-thione. METASOL D3TA may be obtained from Ondo-Nalco, Houston, Tex.

A salt of polynaphthalenesulfonic acid is required by the present invention. An example of a polynaphthalenesulfonic acid is DISAL GPS. The polynaphthalenesulfonic acid and an alkali metal hydroxide are reacted to give a salt of the polynaphthalenesulfonic acid. DISAL GPS may be obtained from Handy Chemical, Montreal, Quebec, Canada.

Wax Emulsions Including Polynaphthalenesulfonic Acid

Table 2 below provides examples of emulsions made according to the embodiments of the present invention. Weights are expressed in terms of grams.

TABLE 2

| Components | Example 1 | Example 2 | Example 3 |
|---|---|---|---|
| Honeywell 3816D | 33.00 | 37.90 | 37.90 |
| Polyphenol 319H | 0.50 | 5.00 | 5.00 |
| Montan Wax | 1.50 | 5.00 | 5.00 |
| SPAN 60 | 0.15 | 0.30 | 0.30 |
| TWEEN 60 | 0.85 | 1.70 | 1.70 |
| 45.5% KOH | | 0.10 | 0.10 |
| DISAL GPS | | | 1.00 |
| Starch | 1.63 | | |
| Borax | 0.38 | | |
| Water | 61.25 | 50.00 | 49.00 |

Alternatively, the emulsion of the present invention can include a useful complexing agent such as a borate compound or a molybdenum compound. The emulsion of the present invention can include a starch. The emulsion of the present invention can include a complexed starch that is a complex of a starch and a complexing agent selected from a borate compound, a molybdenum compound, and the like.

There has been disclosed in accordance with the principles of the present invention an emulsion and gypsum wood fiber product made using such an emulsion. The emulsion is useful in imparting water-resistance to the gypsum wood fiber product. While certain embodiments and best mode of the present invention are described herein, these embodiments are merely illustrative. It will be apparent to those skilled in the art that modifications may be made therein without departing from the spirit of the invention and the scope of the appended claims.

What is claimed is:

1. An emulsion comprising:
   at least one wax;
   a $C_{24}$-$C_{36}$ polymerized methylene coupled alkyl phenol;
   at least one surfactant;
   polynaphthalenesulfonic acid;
   an alkali metal hydroxide; and
   water.

2. The emulsion of claim 1 wherein the alkali metal hydroxide is selected from the group consisting of sodium hydroxide and potassium hydroxide.

3. The emulsion of claim 1 wherein the $C_{24}$-$C_{36}$ polymerized methylene coupled alkyl phenol is present in an amount from about 0.5 to about 10 wt. %, based on total weight of the emulsion.

4. The emulsion of claim 1 wherein the surfactant is selected from the group consisting of a sorbitan ester, a polyoxyethylene sorbitan ester, and combinations thereof.

5. The emulsion of claim 4 wherein the sorbitan ester is sorbitan monostearate.

6. The emulsion of claim 5 wherein the sorbitan monostearate is present in an amount from about 0.5 to about 5 wt. %, based on the total weight of the emulsion.

7. The emulsion of claim 4 wherein the polyoxyethylene sorbitan ester is polyoxyethylene sorbitan monostearate.

8. The emulsion of claim 7 wherein the polyoxyethylene sorbitan monostearate is present in an amount from about 0.5 to about 5 wt. %, based on the total weight of the emulsion.

9. The emulsion of claim 1 wherein the surfactant is a combination of sorbitan monostearate and polyoxyethylene sorbitan monostearate.

10. The emulsion of claim 9 wherein the combination of sorbitan monostearate and polyoxyethylene sorbitan monostearate is present in an amount from about 0.5 to about 5 wt. %, based on the total weight of the emulsion.

11. The emulsion of claim 1 wherein the emulsion comprises a first wax having a melting point of at least 120° F., and a second wax that is a saponifiable wax.

12. The emulsion of claim 11 wherein the first wax is present in an amount from about 30 to about 45 wt. % and the second wax is present in an amount from about 3 to about 5 wt. %, based on the total weight of the emulsion.

13. The emulsion of claim 1 wherein the polynaphthalenesulfonic acid is present in an amount from about 0.25 to about 5 wt. %, based on the total weight of the emulsion.

14. The emulsion of claim 1 further comprising a starch.

15. The emulsion of claim 14 wherein the starch is a complexed starch comprising a starch and a complexing agent selected from the group consisting of a borate compound and a molybdenum compound.

16. The emulsion of claim 15 wherein the starch is selected from the group consisting of unmodified starch, acid-modified starch, hydroxyethylated starch, oxidized starch, and cationic starch.

17. The emulsion of claim 16 wherein the starch is acid-modified starch.

18. The emulsion of claim 15 wherein the ratio of the complexing agent to the starch on a weight per weight basis is from about 1:4 to about 1:20.

19. An emulsion comprising:
a first wax having a melting point of at least 120° F. in an amount of about 30 wt. % to about 45 wt. % by weight, based on the total weight of the emulsion;
a saponifiable wax in an amount from about 3 to about 5 wt. %, based on the total weight of the emulsion;
a combination of surfactants in an amount from about of about 0.5 to about 5 wt. %, based on the total weight of the emulsion
a $C_{24}$-$C_{36}$ polymerized methylene coupled alkyl phenol in an amount from about 0.5 to about 10 wt. %, based on the total weight of the emulsion;
a polynaphthalenesulfonic acid in an amount from about 0.25% to about 5 wt. %, based on the total weight of the emulsion;
water in an amount from about 45 to about 65 wt. %, based on the total weight of the emulsion; and
an alkali metal hydroxide in an amount from about 0.5% to about 3 wt. %, based on the total weight of the emulsion.

20. The emulsion of claim 19 further comprising a complexed starch, the complexed starch comprising a starch and a complexing agent selected from the group consisting of a borate compound and a molybdenum compound.

21. A method for making a gypsum wood fiber article, comprising the steps of:
(a) mixing a slurry containing from about 5 wt. % to about 50 wt. % of a wood fiber, from about 5 wt. % to about 50 wt. % of gypsum, from about 1 wt. % to about 3 wt. % of the emulsion of claim 20, based on the total weight of the slurry and water;
(b) distributing the slurry onto a vacuum wire for formation of a mat;
(c) partially drying the mat of step (b);
(d) compressing the mat of step (c) through a series of vacuum belt rolls; and
(e) drying the compressed mat of step (d) in an oven.

22. The method of claim 21 wherein the emulsion comprises:
a first wax having a melting point of at least 120° F. in an amount of about 30 to about 45 wt. %, based on the total weight of the emulsion;
a saponifiable wax in an amount from about 3 to about 5 wt. %, based on the total weight of the emulsion;
a combination of surfactants in an amount from about 0.5 to about 5%, based on the total weight of the emulsion;
an alkyl phenol in an amount from about of about 5% to about 10% wt. %, based on the total weight of the emulsion;
a polynaphthalenesulfonic acid in an amount from about 0.25% to about 5% wt. %, based on the total weight of the emulsion;
water in an amount of from about 45 to about 65 wt. %, based on the total weight of the emulsion; and
an alkali metal hydroxide in an amount from about 0.5% to about 3 wt. %, based on the total weight of the emulsion.

23. The method of claim 22 wherein the emulsion further comprises a complexed starch, the complexed starch comprising a starch and a complexing agent selected from the group consisting of a borate compound and a molybdenum compound.

* * * * *